Feb. 20, 1968   K. H. YOUNG   3,369,418
TIMING SPROCKET
Filed Jan. 11, 1966
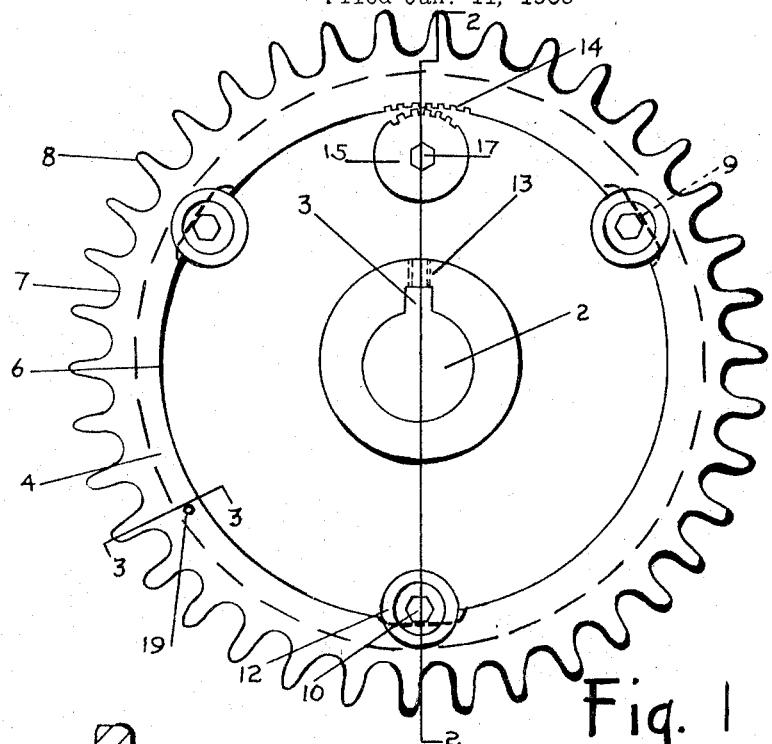
Fig. 1
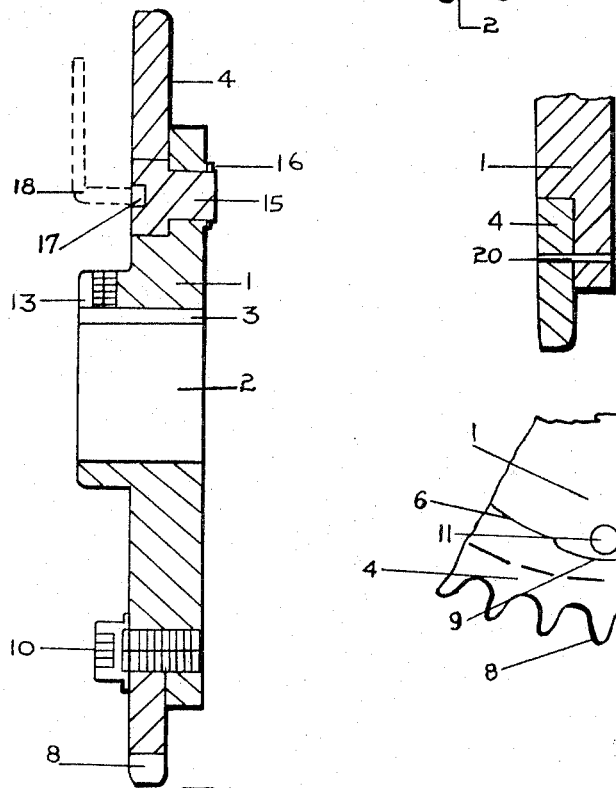
Fig. 2
Fig. 3
Fig. 4
KARL H. YOUNG
INVENTOR.
BY Wm. A. Price
ATTORNEY 3,369,418
TIMING SPROCKET
Karl H. Young, 232 E. Main St., Louisville, Ky. 40202
Filed Jan. 11, 1966, Ser. No. 519,937
5 Claims. (Cl. 74—395)

ABSTRACT OF THE DISCLOSURE

Discloses a timing sprocket for a chain drive, consisting of a hub and sprocket plate in which a series of teeth forming a rack are broached in the step of the plate sprocket so as to engage with a pinion gear mounted in the shoulder portion of the hub. Therefore, in order to advance or delay the sprocket a fraction of the tooth of the sprocket wheel, the pinion gear is turned to move the sprocket plate while the hub remains locked to the shaft of the driving device. The sprocket plate is clamped to the hub by the means of clamping bolts which fit into threaded holes in the hub and over elongated notches around the circumference of the inner periphery of the sprocket plate. Thus, when an adjustment is made, the clamping bolts are loosened to allow the sprocket plate to be advanced or delayed relative to the hub.

---

This invention relates to a timing sprocket for a chain driven apparatus. More specifically, this invention relates to a timing sprocket which is readily adjusted so as to advance or delay the apparatus driven by the chain. More specifically, this invention provides a method and means whereby the sprocket can be adjusted to a different angularly adjusted position relative to the hub or to the shaft or the shaft and key by which said sprocket is driven.

As is well known in the art, many machines of various character are driven by means of a chain drive and are timed through the engagement of links of said chain with the teeth of a sprocket driven by a shaft at a prescribed speed. It is possible in an apparatus which is timed in this manner to change the timing in increments of one tooth of the sprocket wheel by advancing or retarding one or more links of the chain. However, in some instances, it is desirable to change the timing a fraction of one chain link or a fraction of one of the teeth of the sprocket wheel. Thus it may be desirable to advance the sprocket plate 2¼ teeth to change the timing. In such instances, it has been necessary to change either one or several of the sprocket wheels for ones having the required number and size of teeth so that the desired advance or delay is achieved.

It is an object of this invention to provide a method and means whereby a sprocket tooth may be advanced or retarded any fraction of the increment of one tooth.

It is another object of this invention to provide a method and means whereby the angular relation of any one sprocket tooth to the hub may be changed to a desired position.

Still another object of this invention is to provide a simple method and means which allows for quick and ready adjustment of the timing of a sprocket wheel and yet remains simple and economical to produce.

Still another object of this invention is a method and means of adjustment of a sprocket wheel relative to the driving mechanism which can be readily effected in the field by relatively inexperienced personnel.

Other objects will occur to those skilled in the art from the detailed description of my invention which follows.

Basically, my invention involves a simple and effective means whereby the sprocket may be advanced or retarded a fraction of an increment of one sprocket tooth. This is accomplished by provision of the necessary amount of internal gear teeth on the inner peripheral surface of the sprocket plate so as to engage with the teeth of a gear mounted in the hub of the sprocket assembly. Therefore, by turning the gear, it is possible to advance or retard the sprocket plate relative to the hub so as to change the angular relation of the sprocket tooth to the driving mechanism. By providing the appropriate amount of internal teeth so that the series is equivalent to the radial distance of at least one sprocket tooth, it is possible to make fractional adjustments, whereby the sprocket tooth and its chain is advanced or retarded any required fraction of the increment of the driving tooth.

The invention will be better understood by reference to the attached drawings, in which:

FIG. 1 is a front elevation of the sprocket assembly of my invention;

FIG. 2 is a vertical section of said sprocket taken along line 2—2 of FIG. 1;

FIG. 3 is a fragmentary section taken along lines 3—3 of FIG. 1 illustrating the position of a locking pin; and FIG. 4 is a fragmentary illustration of a portion of the sprocket plate and hub with the clamping bolt removed to illustrate the point of attachment of the sprocket plate to the hub.

Referring now to the drawings in detail, the hub 1 contains a bore 2 having a keyway 3 for reception of a shaft. The hub 1, is locked in position on the shaft, not shown, by means of a set screw (not shown) fitted in threaded hole 13. Mounted on the hub is plate sprocket 4 having an inner periphery 6 and an outer periphery 7 containing a series of spaced teeth 8 of a particular pitch. Spaced around the inner periphery 6 of the plate sprocket are elongated notches or indentations 9 for reception of a clamping bolt 10 which engages with the threaded hole 11 in hub 1. Notch 9 is partially hidden by washer 12 through which the clamping bolt is inserted. Machined into a portion of the inner periphery 6 of the plate sprocket 4 are the internal gear teeth 14 which mesh with the teeth of a pinion gear 15 mounted in the hub 1. The remainder of the inner periphery 6 of the plate sprocket 4 coacts with the shoulder of the hub 1 to form a bearing surface. The teeth of the pinion gear extend, preferably, only around a portion of its periphery, the remaining full size portion serving as a guide as to its adjustment. The pinion gear is held in position by means of some suitable retainer 16. Pinion gear 15 contains a socket 17 for reception of an Allen wrench 18.

It will be noted that the pinion gear 15 is so placed that its teeth engage with the series of internal gear teeth 14 in a portion of the inner surface 6 of the place sprocket 4. Therefore, by loosening clamping bolts 10 and by inserting the allen wrench 18 into the socket 17 of the pinion gear 15, it is possible to move the plate sprocket 4 a fraction of the increment of one of the external sprocket teeth 8 while the hub remains keyed to the shaft in a locked position. In this manner, it is possible to change the angular relation of the sprocket tooth 8 relative to the hub so as to advance or retard the sprocket tooth and in so doing change the timing of the chain driven apparatus to which the sprocket is operatively connected. Once the proper angular position is achieved, the clamping bolts 10 are tightened and to further lock the plate against rotation, a hole drilled at any point, one such point indicated by numeral 19, and a steel locking pin 20 is inserted therein. While other methods of locking are possible, and may be applied in certain cases, this operation can be handled in the field by relatively inexperienced personnel.

While many modifications will occur to those skilled in the art from the detailed description provided herein, it will be apparent that various changes may be made in the form construction and arrangement of parts of the invention without departing from the spirit and scope thereof.

I claim:
1. A timing sprocket assembly for a chain driven apparatus which comprises:
- A. a hub having an annular peripheral shoulder, at least one threaded hole in proximity to said shoulder, and a centrally disposed shaft receiving bore, having a keying device therein;
- B. an annular sprocket plate having a central bore mounted on the annular peripheral shoulder of said hub so as to be in bearing relation with said shoulder,
    - (1) said sprocket plate having an outer peripheral surface with a first series of spaced teeth extending therefrom,
    - (2) said central bore having an inner peripheral surface in which a portion of said inner peripheral surface contains a second series of spaced teeth,
    - (3) said central bore containing at least one elongated notch superimposed over said threaded hole;
- C. a threaded bolt removably fitted over said elongated notch and into said threaded hole so as to clamp said sprocket plate and said hub together in variably adjustable angular relation;
- D. gear means mounted in said hub so as to mesh with said second series of spaced teeth; and,
- E. means for turning said gear means so as to move the sprocket plate to a different angularly adjusted position relative to said hub; and,
- F. locking means for positively locking said sprocket plate to said hub after the proper angular adjustment has been made.

2. A timing sprocket assembly as defined in claim 1, in which said locking means comprises:
- A. a hole in said sprocket plate and in said hub;
- B. a pin driven through said hole.

3. A timing sprocket as defined in claim 1 in which the radial distance prescribed by the second series of spaced teeth is equal to the radial distance prescribed by at least one tooth of the first series of spaced teeth.

4. A timing sprocket as defined in claim 1 in which said gear means is a pinion gear.

5. A timing sprocket as defined in claim 1 in which the teeth of said second series are proportionally smaller than the teeth of said first series.

References Cited

UNITED STATES PATENTS

| | | | |
|---|---|---|---|
| 953,424 | 3/1910 | Lindsay. | |
| 1,220,124 | 3/1917 | Hoffner. | |
| 1,358,186 | 11/1920 | Brewer | 123—90 |
| 1,413,213 | 4/1922 | Badger | 123—90 X |
| 1,691,408 | 11/1928 | Palmer | 123—90 X |
| 2,219,857 | 10/1940 | Weston. | |
| 2,654,262 | 10/1953 | Stewart | 74—395 |
| 3,262,435 | 7/1966 | Gribbs | 74—395 X |

ROBERT M. WALKER, *Primary Examiner.*

DONLEY S. STOCKING, *Examiner.*

L. H. GERIN, *Assistant Examiner.*